(12) United States Patent
Peng et al.

(10) Patent No.: US 9,122,931 B2
(45) Date of Patent: Sep. 1, 2015

(54) OBJECT IDENTIFICATION SYSTEM AND METHOD

(71) Applicant: TCL RESEARCH AMERICA INC., Santa Clara, CA (US)

(72) Inventors: Liang Peng, Santa Clara, CA (US); Haohong Wang, Santa Clara, CA (US)

(73) Assignee: TCL RESEARCH AMERICA INC., Santa Clara, CA (US)

( * ) Notice: Subject to any disclaimer, the term of this patent is extended or adjusted under 35 U.S.C. 154(b) by 105 days.

(21) Appl. No.: 14/063,511

(22) Filed: Oct. 25, 2013

(65) Prior Publication Data

US 2015/0117703 A1   Apr. 30, 2015

(51) Int. Cl.
 *G06K 9/00* (2006.01)
 *G06T 11/60* (2006.01)

(52) U.S. Cl.
 CPC ........ *G06K 9/00711* (2013.01); *G06K 9/00718* (2013.01); *G06T 11/60* (2013.01)

(58) Field of Classification Search
 None
 See application file for complete search history.

(56) References Cited

U.S. PATENT DOCUMENTS

| 5,806,030 | A  | * | 9/1998  | Junqua ........................... 704/245 |
| 6,073,096 | A  | * | 6/2000  | Gao et al. ...................... 704/245 |
| 7,113,185 | B2 | * | 9/2006  | Jojic et al. ..................... 345/420 |
| 7,657,102 | B2 | * | 2/2010  | Jojic et al. ..................... 382/224 |
| 8,311,973 | B1 | * | 11/2012 | Zadeh .............................. 706/62 |
| 2003/0123712 | A1 | * | 7/2003 | Dimitrova et al. ............ 382/118 |
| 2005/0047646 | A1 | * | 3/2005 | Jojic et al. ..................... 382/159 |
| 2007/0214418 | A1 | * | 9/2007 | Wang et al. ................... 715/726 |
| 2008/0187231 | A1 | * | 8/2008 | Barbieri et al. ............... 382/225 |
| 2010/0104261 | A1 | * | 4/2010 | Liu et al. .......................... 386/95 |
| 2013/0177203 | A1 | * | 7/2013 | Koo et al. ..................... 382/103 |
| 2014/0201126 | A1 | * | 7/2014 | Zadeh et al. .................... 706/52 |
| 2014/0225924 | A1 | * | 8/2014 | Loxam et al. ................. 345/633 |

FOREIGN PATENT DOCUMENTS

CN          103064086 A     4/2013

* cited by examiner

*Primary Examiner* — Chan Park
*Assistant Examiner* — Iman K Kholdebarin
(74) *Attorney, Agent, or Firm* — Anova Law Group, PLLC

(57) ABSTRACT

An object identification method is provided. The method includes dividing an input video into a number of video shots, each containing one or more video frames. The method also includes detecting target-class object occurrences and related-class object occurrences in each video shot. Further, the method includes generating hint information including a small subset of frames representing the input video and performing object tracking and recognition based on the hint information. The method also includes fusing tracking and recognition results and outputting labeled objects based on the combined tracking and recognition results.

12 Claims, 3 Drawing Sheets

OBJECT IDENTIFICATION SYSTEM AND METHOD

FIELD OF THE INVENTION

The present invention relates to the field of computer video technologies and, more particularly, to techniques for an object identification system.

BACKGROUND

Object identification systems have been quite popular in today's commercial and entertainment businesses. Object identification in video is a problem in computer vision that targets at locating and identifying objects (i.e., giving the exact identity) in a video sequence by a given set of images that contain the objects with known identities. For example, video object identification has been driven by its huge potential in developing applications in many domains including video surveillance security, augmented reality, automatic video tagging, medical analysis, quality control, and video-lecture assessment. Even though object identification is a relatively easy task for human brains, it is challenging for machines due to large variations in the appearance of identified objects in terms of orientation, illumination, expression and occlusion.

The object identification typically involves at least the object detection and the object recognition. For either detection or recognition, existing methods in this domain generally consist of two stages: the learning phase and the recognition phase. In the learning stage, typically a database of static images including different objects is collected as training data. Based on the specific category of objects, features with high discriminative power are extracted. These features are further combined with a certain learning schema to develop a model. In the recognition stage, the new given objects are detected and classified as a certain object by the learned model.

FIG. 1 shows a typical object identification system. As shown in FIG. 1, an object detection module is applied to the input video sequence. Then, an object tracking and recognition module is applied to the detected objects by using a database of labeled objects as training data. After tracking and recognizing process is performed, final labeled objects are outputted.

However, a common difficulty in objet recognition is that the static database used for training usually contains objects that differs greatly from the objects in testing images or video in forms of orientation, illumination, expression and occlusion, which leads to low recognition accuracy. According to disclosed embodiments, video sequence contains a large number of frames which include intrinsic spatio-temporal information that could be used to extract hint information to help object identification. Effectively extracting useful and compact information from video as a hint to help with object identification is a challenging problem which has not been deeply explored.

The disclosed methods and systems are directed to solve one or more problems set forth above and other problems.

BRIEF SUMMARY OF THE DISCLOSURE

One aspect of the present disclosure includes an object identification method. The method includes dividing an input video into a number of video shots, each containing one or more video frames. The method also includes detecting target-class object occurrences and related-class object occurrences in each video shot. Further, the method includes generating hint information including a small subset of frames representing the input video and performing object tracking and recognition based on the hint information. The method also includes fusing tracking and recognition results and outputting labeled objects based on the combined tracking and recognition results.

Another aspect of the present disclosure includes an object identification system. The object identification system includes an object detection module configured to detect target-class object occurrences and related-class object occurrences in each video shot. The object identification system also includes a hint information generation module configured to generate hint information including a small subset of frames representing the input video. Further, the object identification system includes an object tracking and recognition module configured to perform object tracking and recognition based on the hint information and to combine tracking and recognition results. The object identification system also includes an output module configured to output labeled objects based on the combined tracking and recognition results.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
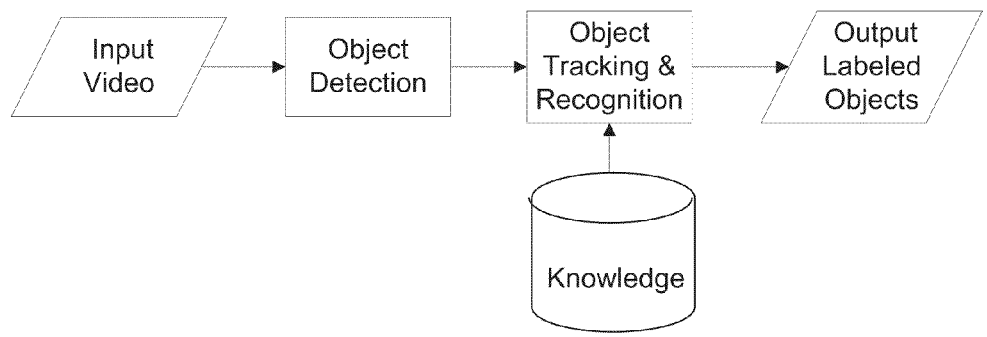
FIG. 1 illustrates an existing object identification system.
Figure 2A:
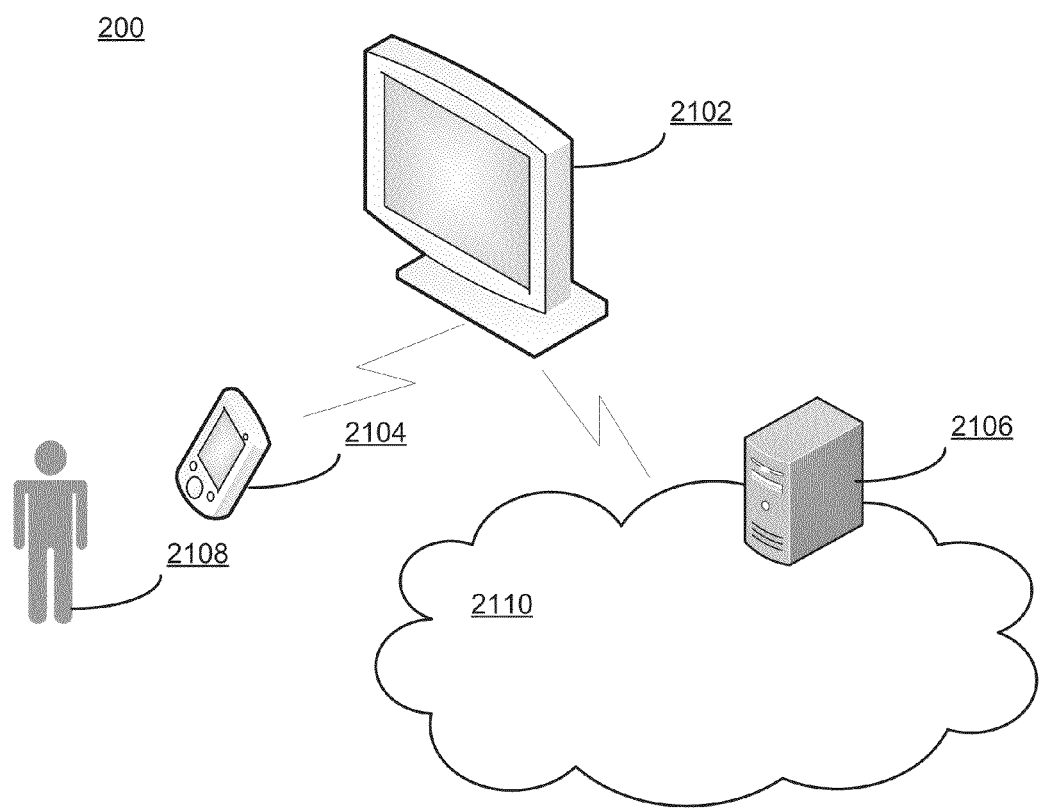
FIG. 2A illustrates an exemplary environment incorporating certain embodiments of the present invention.

FIG. 2A illustrates an exemplary environment 200 incorporating certain embodiments of the present invention. As shown in FIG. 2A, the environment 200 includes a television set (TV) 2102, a remote control 2104, a server 2106, a user 2108, and a network 2110. Other devices may also be included.

TV 2102 may include any appropriate type of TV, such as plasma TV, LCD TV, projection TV, non-smart TV, or smart TV. TV 2102 may also include other computing systems, such as a personal computer (PC), a tablet or mobile computer, or a smart phone, etc. Further, TV 2102 may be any appropriate content-presentation device capable of presenting multiple programs in one or more channels, which may be controlled through remote control 2104.

Remote control 2104 may include any appropriate type of remote control that communicates with and controls the TV 2102, such as a customized TV remote control, a universal remote control, a tablet computer, a smart phone, or any other computing device capable of performing remote control functions. Remote control 2104 may also include other types of devices, such as a motion-sensor based remote control, or a depth-camera enhanced remote control, as well as simple input/output devices such as keyboard, mouse, voice-activated input device, etc.

Further, the server 2106 may include any appropriate type of server computer or a plurality of server computers for providing personalized contents to the user 2108. The server 2106 may also facilitate the communication, data storage, and data processing between the remote control 2104 and the TV 2102. TV 2102, remote control 2104, and server 2106 may communicate with each other through one or more communication networks 2110, such as cable network, phone network, and/or satellite network, etc.

The user 2108 may interact with TV 2102 using remote control 2104 to watch various programs and perform other activities of interest, or the user may simply use hand or body gestures to control TV 2102 if motion sensor or depth-camera is used by TV 2102. The user 2108 may be a single user or a plurality of users, such as family members watching TV programs together.

Figure 2B:
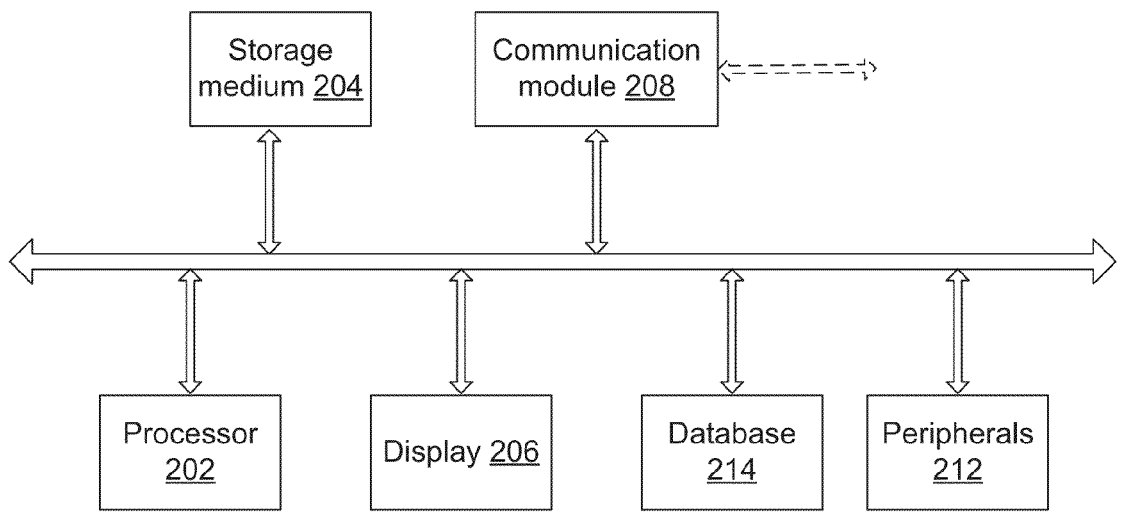
FIG. 2B illustrates an exemplary computing system consistent with the disclosed embodiments.

TV 2102, remote control 2104, and/or server 2106 may be implemented on any appropriate computing circuitry platform. FIG. 2B shows a block diagram of an exemplary computing system capable of implementing TV 2102, remote control 2104, and/or server 2106.

As shown in FIG. 2B, the computing system may include a processor 202, a storage medium 204, a display 206, a communication module 208, a database 214, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 214 may include one or more databases for storing certain data and for performing certain operations on the stored data, such as database searching.

Figure 3:
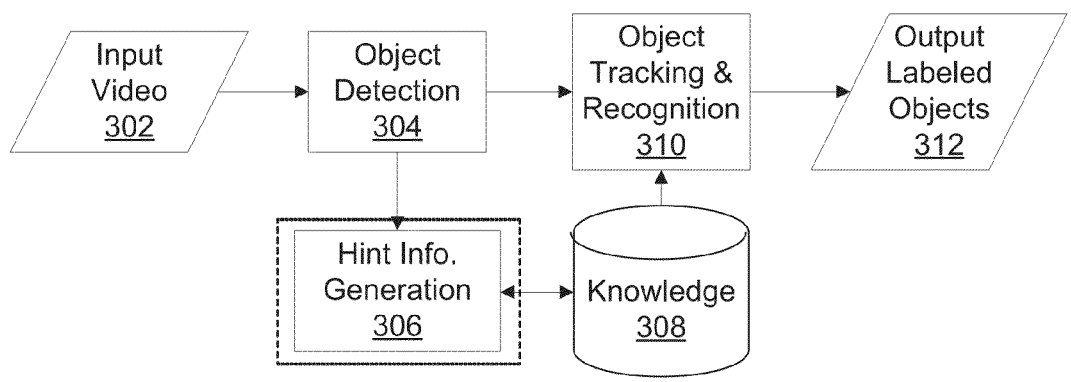
FIG. 3 illustrates an exemplary hint-information based object identification system consistent with the disclosed embodiments.

TV 2102, remote control 2104, and/or server 2106 may implement an object identification system for identifying objects to user 108. FIG. 3 illustrates an exemplary hint-information based object identification system consistent with the disclosed embodiments.

As shown in FIG. 3, the hint-information based object identification system 300 includes an input video 302, an object detection module 304, a hint information generation module 306, knowledge database 308, an object tracking and recognition module 310 and an output module 312. Certain components may be omitted and other components may be added. The system 300 (e.g., the various components) may be implemented in hardware, software, or a combination of hardware and software.

The input video 302 may include any appropriate type of source for video contents and may contain various video sources. The contents from the input video 302 may include both video data and metadata. Plurality of frames may be associated with the video content and may be provided to other modules for processing. A single picture may also be included.

The object detection module 304 may be configured to detect object occurrences in each video shot. That is, the object detection module 304 may automatically find the location of objects of interests pre-defined by users in a sequence of frames. For example, if the user defines the objects of interests across multiple categories such as face, cars and bags, a corresponding detector for each category may be used and run in parallel for the object detection module 304. By running the object detection algorithm, the input video content is processed frame by frame. The frames in which the objects of interests may appear would be recorded with the location (e.g., bounding box) of each object on each of these frames. The object detection module 304 may reside within TV 2102 or outside the TV 2102 depending on particular applications.

The hint information generation module 306 may be configured to generate hint information using summarization and clustering techniques. In general, generation of the hint information refers to obtain a small subset of frames from input video sequences to summarize and represent the video sequences. The subset of frames contain representative detected objects generates the hint information which can help tracking and recognition.

The knowledge database 308 may include any appropriate database to store static images as training data.

The object tracking and recognition module 310 may be configured to perform object tracking and recognition based on the hint information. That is, the object tracking and recognition module 310 may classify each of the detected objects into one single class (based on classes from training data) by using a set of static images (training data). For example, for face recognition, the object tracking and recognition module 310 can use a set of training images that contain different person's faces to classify each detected face in a new set of images into a certain person's face from training data if it passes a pre-defined threshold.

Once the object detection and recognition are done, the output module 312 may be configured to output labeled objects based on the fused or combined tracking and recognition results.

Figure 4:
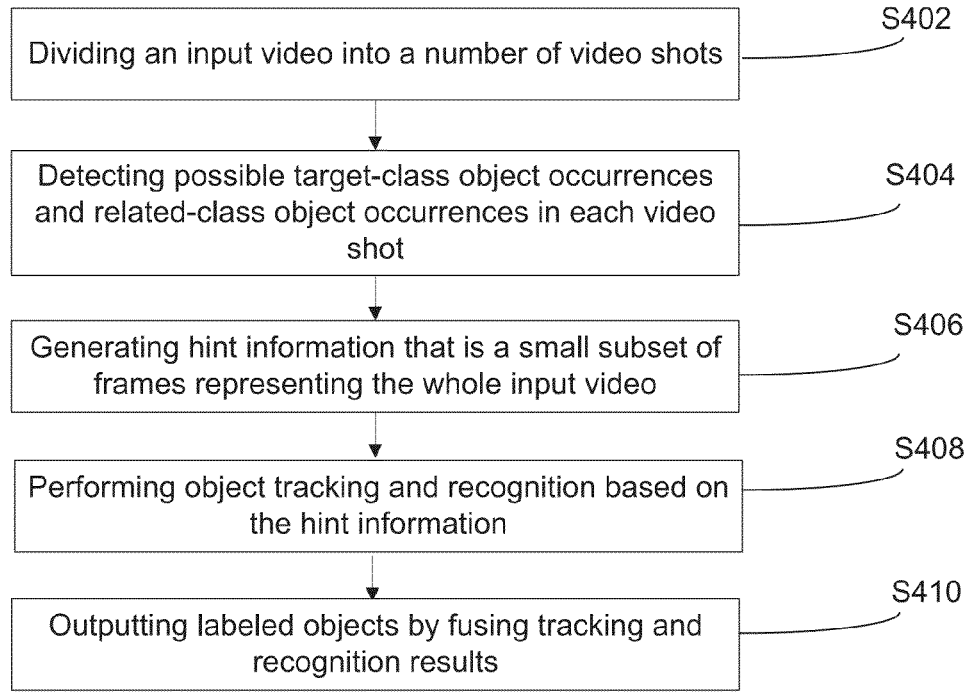
FIG. 4 illustrates a flow chart of an exemplary object identification method consistent with the disclosed embodiments.

FIG. 4 illustrates a flow chart of an exemplary object identification method consistent with the disclosed embodiments. As shown in FIG. 4, the method includes the following steps.

S402: an input video is divided into a number of video shots.

The input video is divided into a plurality of video shots, each containing one or more video frames. The number of video shots to be generated may be determined based on the total storage available and user preferences.

S404: possible target-class object occurrences and related-class object occurrences are detected in each video shot.

After the video shots have been obtained, objects of interests pre-defined by users in the video shots may be detected. Object detection is the process of finding instances of real-world objects (e.g., faces) in the video shots based on predetermined algorithms, including related-class detection and target-class detection. Object detection algorithms typically use extracted features and learning algorithms to detect instances of an object category.

S406: hint information is generated that is a small subset of frames representing the input video.

In S406, key frames are extracted from input video sequences to summarize and represent the video sequences to help object tracking and recognition. Since only frames that contain detected objects are useful, the frames with no objects detected are simply filtered out and only the frames that contain detected objects are kept.

There are several factors to consider for generating hint information in terms of its properties. First, since the hint information to be generated helps object recognition by serving as training data, the hint information should include the frames in which all different objects appear. Second, due to the large variants in pose and illumination comparing the training data and test video sequence, the hint information may have a desired coverage of different poses and illumination changes for each object. Third, since the hint information is used for initial recognition using knowledge, for accuracy of initial recognition, the hint information may have frontal angle of the objects and desired visual quality. The desired visual quality may be interpreted by whether the selected frame has less blurriness (caused by the shifting of the camera) and the object/background in the selected frame have relatively low movements compared to its neighboring frames. The desired visual quality may be evaluated without referring to peak signal-to-noise ratio (PSNR) to avoid possibly misleading the key frame selection.

Figure 5:
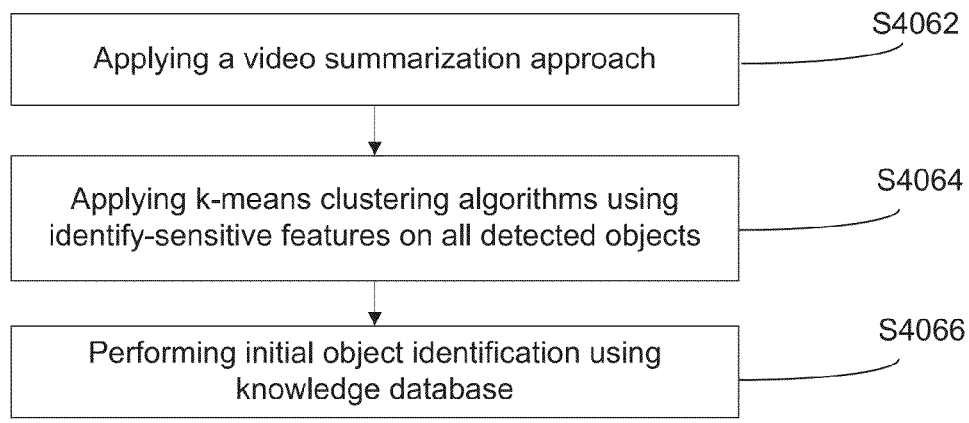
FIG. 5 illustrates a flow chart of generating hint information consistent with the disclosed embodiments.

FIG. 5 illustrates a flow chart of generating hint information consistent with the disclosed embodiments. As shown in FIG. 5, the generating hint information includes the following steps.

S4062: a video summarization approach is applied to extract representative frames.

The goal of video summarization is to make use of the spatio-temporal information from video to generate a subset of frames to summarize the video sequence. The subset of frames containing representative detected objects generates the hint information which can help tracking and recognition. The resultant frames from summarization have several properties driven by the desired training data for recognition as well as key frames for tracking.

From the recognition point of view, the desired training data should have a desired identity coverage (e.g., including some objects from each person) and a desired appearance coverage (i.e. covering variation in terms of poses and illumination).

From Tracking-Learning-Detection (TLD) tracker's perspective, it essentially uses a LUCAS-KANADE (LK) tracking algorithm as estimates of the optical flow with many other post-processing steps. The TLD tracker uses patches found on the trajectory of an optic-flow-based tracker in order to train an object detector. Based on the assumptions of LK tracking which are brightness, temporal persistence and spatial coherence, the hint information should have a desired local representation (i.e., represent neighboring frames) so that the move of tracked object has small change in terms of appearances and displacement vector, which provides the robustness of tracker in each segment of the video.

From the above two perspectives, desired summary of video should possess the following four properties: (1) a desired identity coverage; (2) a desired local representation in terms of temporal information; (3) a desired pose variation coverage; (4) a desired illumination variation coverage. In addition, the selected frames may satisfy a constraint, which the objects in the selected frames should be easy to recognize in terms of the frontal degree and visual quality.

For the remaining factors, the problem is formulated as follows. Let N represent a total number of frames in the video which contain detection results, $\{O_{i,x}\}$ represents the xth object on frame i (i=1, ..., M; x=1, ..., $X_i$, where $X_i$ is a total number of objects on frame i), and the goal is to select M frames $\{a_i\}$(i=1, ..., M) which could provide the desired representative frames of the video for object recognition purpose.

The desired local representation means that the selected frames would have desired local similarity among its neighboring frames. That is, the object regions in the selected frame would have substantial similarity with the object in its neighboring frames in terms of objects' identities (i.e., the selected frame contains the objects that are similar enough to represent the objects in its neighboring frames). In other words, the key frames would be similar enough to their neighbor frames so as to represent the neighbor frames in the final summary frame sequence. The similarity may be measured based various factors.

Let L represent a feature vector that is sensitive to object identity, but invariant to other variations such as pose, illumination (e.g. local binary patterns for face object). Sim(·) represents a function that measures similarity (e.g. correlation). The local representation of the ith frame (i.e. average similarities of the feature vector L between pairwise comparison of all objects between two neighboring frames) can be defined by:

$$A(i) = \begin{cases} \dfrac{\sum_{q=1}^{X_i} \sum_{p=1}^{X_{i-1}} (Sim(L_{i-1,p}, L_{i,q}))}{X_i X_{i-1}} & \text{if } i = N \\ \dfrac{1}{2} \dfrac{\sum_{q=1}^{X_i} \sum_{p=1}^{X_{i-1}} (Sim(L_{i-1,p}, L_{i,q}))}{X_i X_{i-1}} + \\ \dfrac{1}{2} \dfrac{\sum_{q=1}^{X_i} \sum_{p=1}^{X_{i+1}} (Sim(L_{i+1,p}, L_{i,q}))}{X_i X_{i+1}} & \text{otherwise} \end{cases} \quad (1)$$

where N is a total number of frames in the video which contain detection results; $L_{i,q}$ is a feature vector of object $O_q$ in the ith frame; $L_{i-1,p}$ is a feature vector of object $O_p$ in the (i−1)th frame; $L_{i+1,p}$ is a feature vector of object $O_p$ in the (i+1)th frame; and $X_{i-1}$, $X_i$ and $X_{i+1}$ are a total number of objects on the ith−1 frame, the ith frame and the ith+1 frame, respectively.

The desired pose variation coverage can be interpreted as that object regions of consecutive selected frames have a large dissimilarity in terms of pose. Let G represent the feature vector that is sensitive to different poses of an object, the pose similarity of key frames can be defined by:

$$B(i) = \begin{cases} 0 & \text{if } i = N \\ \theta \dfrac{\sum_{q=1}^{X_i} \sum_{p=1}^{X_j} (Sim(G_{i,p}, G_{j,q}))}{X_i X_j} + \\ (1-\theta) \dfrac{\sum_{q=1}^{X_i} \sum_{p=1}^{X_j} (Sim(G_{j,p}, G_{i,q}))}{X_i X_j} & \text{otherwise} \end{cases} \quad (2)$$

where N is a total number of frames in the video which contain detection results; Sim(·) is a function that measures similarity; $G_{i,q}$ is a feature vector of object $O_q$ in the ith frame; $G_{j,q}$ is a feature vector of object $O_q$ in the jth frame; $G_{i,p}$ is a feature vector of object $O_p$ in the ith frame; $G_{j,p}$ is a feature vector of object $O_p$ in the jth frame; θ is a weighting factor between [0, 1]; and $X_i$ and $X_j$ are a total number of objects on frame i and j, respectively.

Similarly, the desired illumination variation coverage can be interpreted as that object regions of consecutive selected frames have large dissimilarity in terms of illumination. Let Lum denote the illumination from RGB image (weighted value), the illumination similarity of summary frames can be defined by:

$$C(i) = \begin{cases} 0 & \text{if } i = N \\ \eta \frac{\sum_{q=1}^{X_i}\sum_{p=1}^{X_j}(Sim(Lum_{i,p}, Lum_{j,q}))}{X_i X_j} + \\ (1-\eta)\frac{\sum_{q=1}^{X_i}\sum_{p=1}^{X_j}(Sim(Lum_{j,p}, Lum_{i,q}))}{X_i X_j} & \text{otherwise} \end{cases} \quad (3)$$

where N is a total number of frames in the video which contain detection results; Sim(·) is a function that measures similarity; $Lum_{i,q}$ is a feature vector of object $O_q$ in the ith frame; $Lum_{j,q}$ is a feature vector of object $O_q$ in the jth frame; $Lum_{i,p}$ is a feature vector of object $O_p$ in the ith frame; $Lum_{j,p}$ is a feature vector of object $O_p$ in the jth frame; η is a weighting factor between [0, 1]; and $X_i$ and $X_j$ are a total number of objects on frame i and j, respectively.

Let $E(a_i)$ represent the easiness for recognition for frame $a_i$. R is a pre-defined threshold. M is the number of the selected frames. The easiness (weighted average of frontal degree measurement and visual quality measurement) of all selected frames on average should pass the threshold R. The constraint is defined by:

$$\frac{\sum_{i=1}^{M} E(a_i)}{M} \geq R \quad (4)$$

Based on these desired properties, a desired summary frame sequence would have larger $$\sum_{i=1}^{M} A(a_i),$$

smaller $$\sum_{i=1}^{M} B(a_{i-1}, a_i)$$

and smaller $$\sum_{i=1}^{M} C(a_{i-1}, a_i).$$

Hence, the problem can be formalized into an optimization problem by:

$$MinimizeT(a_1, a_2, \ldots, a_M) = \quad (5)$$
$$\sum_{i=1}^{M} \{\alpha[1 - A(a_i)] + \beta B(a_{i-1}, a_u) + (1 - \alpha - \beta)C(a_{i-1}, a_u)\}$$

where α and β are weighting parameters between [0, 1] with inequality constraint.

Since this is an optimization problem with inequality constraint, the associated Lagrangian can be defined by:

$$L(a_1, a_2, \ldots, a_M) = \quad (6)$$
$$\sum_{i=1}^{M} \{\alpha[1 - A(a_i)] + \beta B(a_{i-1}, a_u) + (1 - \alpha - \beta)C(a_{i-1}, a_u)\} +$$
$$\lambda \left( R - \frac{\sum_{i=1}^{M} E(a_i)}{M} \right)$$

Thus, the formulated problem is converted to a standard constrained nonlinear optimization problem. The optimal solution of this optimization problem can be solved by method of Lagrange. In some case, Newton-Raphson method is also used to solve it numerically.

S4064: k-means clustering algorithms are applied using identify-sensitive features on all detected objects.

To achieve desired identity coverage, the problem is converted into an unsupervised learning. Thus, k-means clustering algorithms may be applied using identify-sensitive features (e.g., local binary patterns for face) on all detected objects to form k clusters, where k equals to the number of objects need to be identified in the video. The k-means clustering aims to partition all detected objects into k clusters in which each detected object belongs to the cluster with the nearest mean, serving as a prototype of the cluster. Further, the frames which contain the k centroid objects are selected. After applying summarization and clustering, the union of the frames set is used to perform initial recognition.

As used herein, the face is used as an example for detailed illustration purpose. The problem generally applies to other categories of objects by substituting face feature with the features from other categories of objects.

S4066: initial object identification is performed using knowledge database.

After key frames are extracted, the objects from key frames are cropped out and the knowledge database (i.e. objects with known labels) is used as training data to do classification on these objects. That is, each of the detected objects is classified into one single class (based on classes from training data) by using a set of static images (training data). For example, Local Binary Pattern (LBP) may be used as feature vector and the nearest neighbor is applied as a classifier to label all faces in face identification. That is, each face is classified as the class of the nearest neighbor with a confidence computed by the ratio of the nearest distance to a pre-defined tolerance threshold. This labeled data is used as training data for recognizing objects. If some misclassified labels for these labeled data are corrected, the accuracy in object recognition is further improved.

S408: object tracking and recognition is performed based on the hint information.

The hint information can provide representative views of each object covering various changes of poses, angles and illumination from different frames in the video. Thus, the hint information can substantially increase the classification accuracy. For example, face recognition typically means using a set of training images that contain different person's faces to classify each detected face in a new set of images into a certain person's face from training data if it passes a predefined threshold. Based on the hint information, face recognition and object tracking algorithms together are applied on all video frames containing detected faces.

S410: labeled objects are obtained as the final output by fusing the tracking and recognition results.

In S410, the labeled objects are obtained by the following schema: if the tracking result is null, recognition result is used; if tracking result is not null, the confidence from recognition and tracking are compared and the one with higher confidence is selected. The labeled objects may also be displayed on a different terminal other than the current display terminal or screen.

The disclosed object identification method and system can identify objects in video based on hint information, improving tracking and recognition accuracy. Furthermore, the hint information is generated using summarization and clustering techniques to help tracking and recognition. The disclosed system also includes object detection, object recognition, and tracking as integrated to improve the accuracy of object identification. The systems and methods are suitable for identifying human interested objects in practical application. It should be noted that, the concept for the object identification systems and methods can be extended to other services. For example, with support of the object identification system, a user spends less time in searching for products that he/she desires in TV shopping service. The disclosed systems and methods can also be extended to other devices with displays, such as cell phones, tablets, PCs, watches, and so on, to enable a unique user interaction experience. Other applications, advantages, alternations, modifications, or equivalents to the disclosed embodiments are obvious to those skilled in the art.

What is claimed is:

1. An object identification method, comprising:
dividing an input video into a number of video shots, each containing one or more video frames;
detecting target-class object occurrences and related-class object occurrences in each video shot;
generating hint information including a small subset of frames representing the input video;
performing object tracking and recognition based on the hint information;
combining tracking and recognition results; and
outputting labeled objects based on the combined tracking and recognition results;
wherein generating hint information including a small subset of frames representing the input video further includes:
applying a video summarization approach;
applying k-means clustering algorithms using identify-sensitive features on all detected objects; and
performing initial object identification using a knowledge database;
wherein the hint information possesses a desired identity coverage, a desired local representation, a desired pose variation coverage and a desired illumination variation coverage.

2. The method according to claim 1, wherein performing object tracking and recognition based on the hint information further includes:
classifying each of detected objects into one single class by using a set of static images.

3. The method according to claim 1, wherein applying k-means clustering algorithms using identify-sensitive features on all detected objects further includes:
selecting the frames which contain k centroid objects, where k equals to a total number of objects need to be identified in the input video.

4. The method according to claim 1, wherein:
provided that i, p, q are integers; L is a feature vector that is sensitive to object identity; Sim(·) is a function that measures similarity, a local representation of the ith frame is define by:

$$A(i) = \begin{cases} \dfrac{\sum_{q=1}^{X_i} \sum_{p=1}^{X_{i-1}} (Sim(L_{i-1,p}, L_{i,q}))}{X_i X_{i-1}} & \text{if } i = N \\ \dfrac{1}{2}\dfrac{\sum_{q=1}^{X_i} \sum_{p=1}^{X_{i-1}} (Sim(L_{i-1,p}, L_{i,q}))}{X_i X_{i-1}} + \\ \dfrac{1}{2}\dfrac{\sum_{q=1}^{X_i} \sum_{p=1}^{X_{i+1}} (Sim(L_{i+1,p}, L_{i,q}))}{X_i X_{i+1}} & \text{otherwise} \end{cases}$$

where N is a total number of frames in the input video which contain detection results; $L_{i,q}$ is a feature vector of object $O_q$ in the ith frame; $L_{i-1,p}$ is a feature vector of object $O_p$ in the (i−1)th frame; $L_{i+1,p}$ is a feature vector of object $O_p$ in the (i+1)th frame; and $X_{i-1}$, $X_i$ and $X_{i+1}$ are a total number of objects on the ith-1 frame, the ith frame and the ith+1 frame, respectively.

5. The method according to claim 1, wherein:
the desired pose variation coverage is interpreted as that object regions of consecutive selected frames have a large dissimilarity in terms of pose; and
provided that i, j, p, q are integers; G denotes a feature vector that is sensitive to different poses of an object, the pose similarity of key frames is defined by:

$$B(i) = \begin{cases} 0 & \text{if } i = N \\ \theta \dfrac{\sum_{q=1}^{X_i} \sum_{p=1}^{X_j} (Sim(G_{i,p}, G_{j,q}))}{X_i X_j} + \\ (1-\theta)\dfrac{\sum_{q=1}^{X_i} \sum_{p=1}^{X_j} (Sim(G_{j,p}, G_{i,q}))}{X_i X_j} & \text{otherwise} \end{cases}$$

where N is a total number of frames in the input video which contain detection results; Sim(·) is a function that measures similarity; $G_{i,q}$ is a feature vector of object $O_q$ in the ith frame; $G_{j,q}$ is a feature vector of object $O_q$ in the jth frame; $G_{i,p}$ is a feature vector of object $O_p$ in the ith frame; $G_{j,p}$ is a feature vector of object $O_p$ in the jth frame; θ is a weighting factor between [0, 1]; and $X_i$ and $X_j$ are a total number of objects on frame i and j, respectively.

6. The method according to claim 1, wherein:

the desired illumination variation coverage is interpreted as that object regions of consecutive selected frames have large dissimilarity in terms of illumination; and provided that i, j, p, q are integers; Lum denotes the illumination from RGB image, the illumination similarity of summary frames is defined by:

$$C(i) = \begin{cases} 0 & \text{if } i = N \\ \eta \dfrac{\sum_{q=1}^{X_i}\sum_{p=1}^{X_j}(Sim(Lum_{i,p}, Lum_{j,q}))}{X_i X_j} + \\ \quad (1-\eta)\dfrac{\sum_{q=1}^{X_i}\sum_{p=1}^{X_j}(Sim(Lum_{j,p}, Lum_{i,q}))}{X_i X_j} & \text{otherwise} \end{cases}$$

where N is a total number of frames in the input video which contain detection results; Sim(·) is a function that measures similarity; $Lum_{i,q}$ is a feature vector of object $O_q$ in the ith frame; $Lum_{j,q}$ is a feature vector of object $O_q$ in the jth frame; $Lum_{i,p}$ is a feature vector of object $O_p$ in the ith frame; $Lum_{j,p}$ is a feature vector of object $O_p$ in the jth frame; η is a weighting factor between [0, 1]; and $X_i$ and $X_j$ are a total number of objects on frame i and j, respectively.

7. An object identification system, comprising:

an object detection module configured to detect target-class object occurrences and related-class object occurrences in each video shot of an input video;

a hint information generation module configured to generate hint information including a small subset of frames representing the input video;

an object tracking and recognition module configured to perform object tracking and recognition based on the hint information and to combine tracking and recognition results; and an output module configured to output labeled objects based on the combined tracking and recognition results;

wherein the hint information generation module is further configured to:

apply a video summarization approach;

apply k-means clustering algorithms using identify-sensitive features on all detected objects; and perform initial object identification using a knowledge database wherein the hint information possesses a desired identity coverage, a desired local representation, a desired pose variation coverage and a desired illumination variation coverage.

8. The system according to claim 7, wherein the object tracking and recognition module is further configured to:

classify each of detected objects into one single class by using a set of static images.

9. The system according to claim 7, wherein:

the k-means clustering algorithms are applied using identify-sensitive features on all detected objects to select the frames which contain the k centroid objects, where k equals to a total number of objects need to be identified in the video.

10. The system according to claim 7, wherein:

provided that i, p, q are integers; L is a feature vector that is sensitive to object identity; Sim(·) is a function that measures similarity, the local representation of the ith frame is define by:

$$A(i) = \begin{cases} \dfrac{\sum_{q=1}^{X_i}\sum_{p=1}^{X_{i-1}}(Sim(L_{i-1,p}, L_{i,q}))}{X_i X_{i-1}} & \text{if } i = N \\ \dfrac{1}{2}\dfrac{\sum_{q=1}^{X_i}\sum_{p=1}^{X_{i-1}}(Sim(L_{i-1,p}, L_{i,q}))}{X_i X_{i-1}} + \\ \quad \dfrac{1}{2}\dfrac{\sum_{q=1}^{X_i}\sum_{p=1}^{X_{i+1}}(Sim(L_{i+1,p}, L_{i,q}))}{X_i X_{i+1}} & \text{otherwise} \end{cases}$$

where N is a total number of frames in the input video which contain detection results; $L_{i,q}$ is a feature vector of object $O_q$ in the ith frame; $L_{i-1,p}$ is a feature vector of object $O_p$ in the (i−1)th frame; $L_{i+1,p}$ is a feature vector of object $O_p$ in the (i+1)th frame; and $X_{i-1}$, $X_i$ and $X_{i+1}$ are a total number of objects on the ith-1 frame, the ith frame and the ith+1 frame, respectively.

11. The system according to claim 7, wherein:

the desired pose variation coverage is interpreted as that object regions of consecutive selected frames have a large dissimilarity in terms of pose; and provided that i, j, p, q are integers; G denotes a feature vector that is sensitive to different poses of an object, the pose similarity of key frames is defined by:

$$B(i) = \begin{cases} 0 & \text{if } i = N \\ \theta \dfrac{\sum_{q=1}^{X_i}\sum_{p=1}^{X_j}(Sim(G_{i,p}, G_{j,q}))}{X_i X_j} + \\ \quad (1-\theta)\dfrac{\sum_{q=1}^{X_i}\sum_{p=1}^{X_j}(Sim(G_{j,p}, G_{i,q}))}{X_i X_j} & \text{otherwise} \end{cases}$$

where N is a total number of frames in the input video which contain detection results; Sim(·) is a function that measures similarity; $G_{i,q}$ is a feature vector of object $O_q$ in the ith frame; $G_{j,q}$ is a feature vector of object $O_q$ in the jth frame; $G_{i,p}$ is a feature vector of object $O_p$ in the ith frame; $G_{j,p}$ is a feature vector of object $O_p$ in the jth frame; θ is a weighting factor between [0, 1]; and $X_i$ and $X_j$ are a total number of objects on frame i and j, respectively.

12. The system according to claim 7, wherein:

the desired illumination variation coverage is interpreted as that object regions of consecutive selected frames have large dissimilarity in terms of illumination; and provided that i, j, p, q are integers; Lum denotes the illumination from RGB image, the illumination similarity of summary frames is defined by:

$$C(i) = \begin{cases} 0 & \text{if } i = N \\ \eta \dfrac{\sum_{q=1}^{X_i} \sum_{p=1}^{X_j} (Sim(Lum_{i,p}, Lum_{j,q}))}{X_i X_j} + \\ \quad (1-\eta) \dfrac{\sum_{q=1}^{X_i} \sum_{p=1}^{X_j} (Sim(Lum_{j,p}, Lum_{i,q}))}{X_i X_j} & \text{otherwise} \end{cases}$$

where N is a total number of frames in the video which contain detection results; $Sim(\cdot)$ is a function that measures similarity; $Lum_{i,q}$ is a feature vector of object $O_q$ in the ith frame; $Lum_{j,q}$ is a feature vector of object $O_q$ in the jth frame; $Lum_{i,p}$ is a feature vector of object $O_p$ in the ith frame; $Lum_{j,p}$ is a feature vector of object $O_p$ in the jth frame; $\eta$ is a weighting factor between [0, 1]; and $X_i$ and $X_j$ are a total number of objects on frame i and j, respectively.

\* \* \* \* \*